United States Patent
Yao et al.

(10) Patent No.: US 10,203,821 B2
(45) Date of Patent: Feb. 12, 2019

(54) DISPLAY PANEL AND DISPLAY DEVICE WITH AUXILIARY TOUCH ELECTRODE

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Qijun Yao, Shanghai (CN); Xingyao Zhou, Shanghai (CN); Liang Liu, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 10 days.

(21) Appl. No.: 15/202,277

(22) Filed: Jul. 5, 2016

(65) Prior Publication Data

US 2017/0228064 A1     Aug. 10, 2017

(30) Foreign Application Priority Data

Feb. 4, 2016  (CN) .......................... 2016 1 0080727

(51) Int. Cl.
*G06F 3/044*  (2006.01)
*G06F 3/041*  (2006.01)
*G02F 1/1333*  (2006.01)

(52) U.S. Cl.
CPC .......... *G06F 3/044* (2013.01); *G02F 1/13338* (2013.01); *G06F 3/0412* (2013.01); *G06F 2203/04112* (2013.01)

(58) Field of Classification Search
CPC ....... G06F 3/044; G06F 3/0412; G06F 3/0416
(Continued)

(56) References Cited

U.S. PATENT DOCUMENTS

2011/0175671 A1* 7/2011 Reynolds ................ G06F 3/044
                                                      327/517
2011/0316809 A1* 12/2011 Kim ...................... G06F 3/0412
                                                      345/174
(Continued)

FOREIGN PATENT DOCUMENTS

CN          102252371 A      11/2011
CN          102298473 A      12/2011
(Continued)

*Primary Examiner* — Yuzhen Shen
(74) *Attorney, Agent, or Firm* — Kilpatrick Townsend & Stockton LLP

(57) ABSTRACT

A display panel and a display device are disclosed. The display includes a first substrate and a second substrate disposed opposite to the first substrate. The first substrate includes a plurality of touch electrodes arranged in an array. The second substrate includes a plurality of auxiliary touch electrodes, and a projection of each of the plurality of auxiliary touch electrodes partly overlaps with projections of two adjacent touch electrodes of the plurality of touch electrodes in a direction perpendicular to the second substrate. In the touch operation, a coupling capacitor is formed between the touch medium and the auxiliary touch electrode, another coupling capacitor is formed between the auxiliary touch electrode and the touch electrode, so that more touch electrodes are involved in each touch operation, thus reducing the difficulty of determining the touch position and the precision requirement for the touch operation.

16 Claims, 8 Drawing Sheets

(58) Field of Classification Search
USPC .......................................................... 345/173
See application file for complete search history.

(56) References Cited

U.S. PATENT DOCUMENTS

| | | | | |
|---|---|---|---|---|
| 2012/0274612 | A1* | 11/2012 | Sogabe | H01L 27/124 345/204 |
| 2012/0313881 | A1* | 12/2012 | Ge | G02F 1/13338 345/174 |
| 2015/0034687 | A1 | 2/2015 | Terleski et al. | |
| 2015/0317010 | A1* | 11/2015 | Yashiro | G06F 3/044 345/174 |
| 2015/0346874 | A1* | 12/2015 | Park | G06F 3/044 345/174 |
| 2016/0132180 | A1* | 5/2016 | Kao | G06F 3/044 345/174 |
| 2016/0139727 | A1* | 5/2016 | Kim | G06F 3/044 345/174 |
| 2016/0209688 | A1* | 7/2016 | Kim | G06F 3/044 |
| 2017/0192508 | A1* | 7/2017 | Lim | G06F 3/016 |

FOREIGN PATENT DOCUMENTS

| | | | |
|---|---|---|---|
| CN | 102725720 | A | 10/2012 |
| CN | 104636012 | A | 5/2015 |
| CN | 104699346 | A | 6/2015 |
| CN | 104823141 | A | 8/2015 |

* cited by examiner

DISPLAY PANEL AND DISPLAY DEVICE WITH AUXILIARY TOUCH ELECTRODE

CROSS-REFERENCES TO RELATED APPLICATIONS

This application claims priority to Chinese Patent Application No. 201610080727.4, filed with the Chinese Patent Office on Feb. 4, 2016 and entitled "Display Panel And Display Device", the contents of which are incorporated herein by reference in their entirety.

TECHNICAL FIELD

The disclosure relates to the field of touch display technologies, particularly to a display panel and a display device.

BACKGROUND

With the rapid development of the display technology, the touch panel has been widely used in people's lives. Compared with the conventional display device which merely provides a display function, the display device using the touch panel allows a user and a display control host to exchange information with each other. Therefore, the touch panel can completely or at least partially replace the common input device, so that the display device with the touch panel not only performs a display function but also performs a touch function.

The common touch panel can be classified into: a resistive touch panel, a capacitive touch panel, an electromagnetic touch panel and an infrared touch panel, etc. The capacitive touch panel works by means of the human's current induction. As shown in FIG. 1, when a finger touches the capacitive touch panel, a coupling capacitor is formed between the finger and the working area of capacitive touch panel (that is, a touch electrode 111 shown in FIG. 1) due to the human electric field. Since the working area is supplied with a high-frequency current in which case the capacitor is a direct conductor, a tiny current is sucked from the touch point by the finger. The position of the touch point is calculated according to the change in the capacitance of the touch point, thereby achieving the touch function.

However, in electronic terminals with the capacitive touch panel, finger is not the only medium to realize a touch process, and a stylus may also be a tool to realize a touch process. In the case that the touch panel is touched by a finger, a contact area in a touch process is relatively large due to the natural shape and size of the finger, and hence intensity of the current induced by the coupling capacitor is changed largely, so that the touch position is precisely calculated. However, when the touch panel is touched by a stylus, the contact area in a touch process is relatively small due to the shape and the size of the stylus, and hence the intensity of the current induced by the coupling capacitor is changed small so that it is difficult to determine the touch position, leading to a higher accurate operation requirement on the touch process.

Hence, in the capacitive touch panel of the related art, for example in the arrangement shown in FIG. 2A, to achieve the detection of the stylus, the common electrode 101 is generally arranged as a complex polygons, in order to allow the touch operation to be detected by more touch electrodes (that is, common electrodes 101). In the touch period, this arrangement indeed has a good effect on the touch operation, especially in the case of using the stylus. However, in the display period, the complex polygons of the common electrode 101 may lead to an abnormal display.

During the display process, pixel dots are refreshed row-by-row in display. In FIG. 2B, illustratively, a row a, a row b, a row c and a row d correspond to different rows of pixel electrodes. As the row a is displayed, the pixel electrodes of the row a are charged simultaneously, and an intensity Ca affected by the parasitic capacitor on the common electrode 101 is formed. As the pixels of the row b, the row c and the row d are refreshed, intensities Cb, Cc and Cd affected by the parasitic capacitors on the common electrode 101 are formed, respectively. Lengths of the pixels of the row a, the row b, the row c and the row d corresponding to the common electrode 101 are different, causing different intensities affected on the same common electrode 101. As shown in FIG. 2B, it is shown that Cb=Cc>Ca>Cd, and hence the perturbations on the common electrode 101 are also different. In FIG. 2B, the perturbation of the region between the row b and the row c is relatively large. Such a difference in the perturbations would cause the brightness of region 40 to be higher than the brightness of the region 41 in the display process for example, thus generating bright stripes in a lateral direction, as shown in FIG. 2C.

In FIG. 2D, positions A, B and C are different, and the distance between the chip and the positions A, B and C are also different. The recovery capabilities of the perturbations of common electrode 101 at the different positions are affected by the corresponding resistance variations due to such different distances. A smaller resistance value leads to a stronger anti-perturbation capability. That is, the recovery capabilities at the position A and the position C are poorer than the recovery capability at the position B, thus causing a greater perturbation at the position A and the position C. Such a difference in the recovery capabilities, for example, would cause the brightness of region 50 to be higher than that of region 51 in the display process, thus generating bright stripes in a vertical direction, as shown in FIG. 2E.

Due to the impact of the bright stripes in the lateral direction shown in FIG. 2C and the bright stripes in the vertical direction shown in FIG. 2E, alternately varying gray scales are formed on the screen, as shown in FIG. 2F. It should be noted that FIG. 2F merely illustratively and schematically shows the gray scales are varying alternately, and such black and white appearance on FIG. 2F is not a real display effect.

SUMMARY

Embodiments provide a display panel and a display device, to solve the problem of determination accuracy and operation precision in the related art when the capacitive touch panel is touched with a stylus.

To this end, technical solutions are as follow:

In one aspect, it provides a display panel, which comprises a first substrate and a second substrate opposite to the first substrate. The first substrate includes a plurality of touch electrodes arranged in an array, and the second substrate includes a plurality of auxiliary touch electrodes. A projection of each of the plurality of auxiliary touch electrodes partly overlaps with projections of two adjacent touch electrodes in a direction perpendicular to the second substrate.

In another aspect, it provides a display device, which includes the above display panel.

In various embodiments, the plurality of auxiliary touch electrodes are arranged between the plane including touch electrode and the touch contact plane, and a projection of each of the plurality of auxiliary touch electrodes partly overlaps projections of two adjacent touch electrodes in the direction perpendicular to the second substrate. In a touch operation, a coupling capacitor is formed between the touch medium (such as a finger or a stylus) and the auxiliary touch electrode and a coupling capacitor is formed between the auxiliary touch electrode and the touch electrode, so that the effective vertical distance between the touch medium and the touch electrode is decreased, and more touch electrodes are involved in each touch operation, thus reducing the difficulty of determining the touch position and the precision requirement for the touch operation.

DETAILED DESCRIPTION

For better understanding of the present disclosure, the disclosure will be further described below with reference to the accompanying drawings. However, the disclosure can be implemented in different manners and should not be considered to be limited to the described embodiments. Based on the embodiments in the disclosure, other embodiments obtained by those skilled in the art without creative work also belong to the scope of protection of the disclosure. The schematic top view in the disclosure is the view seen along the arrow in FIG. 3B.

Figure 1:
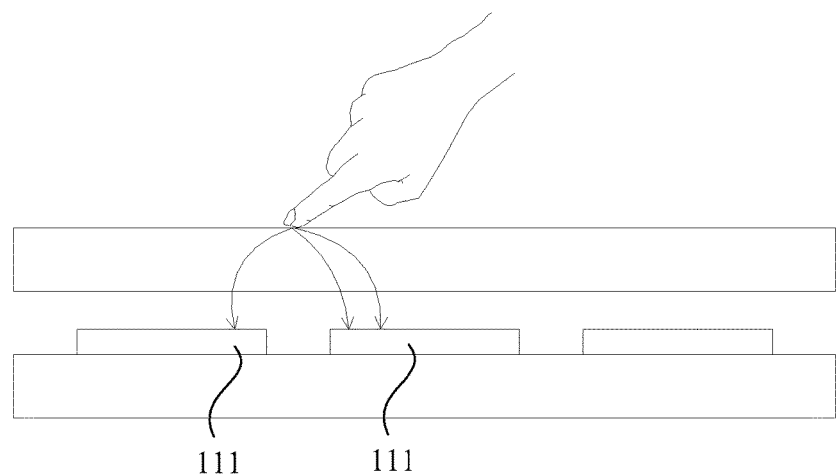
FIG. 1 is a schematic diagram showing the principle of the capacitive touch panel in the related art.
Figure 2A:
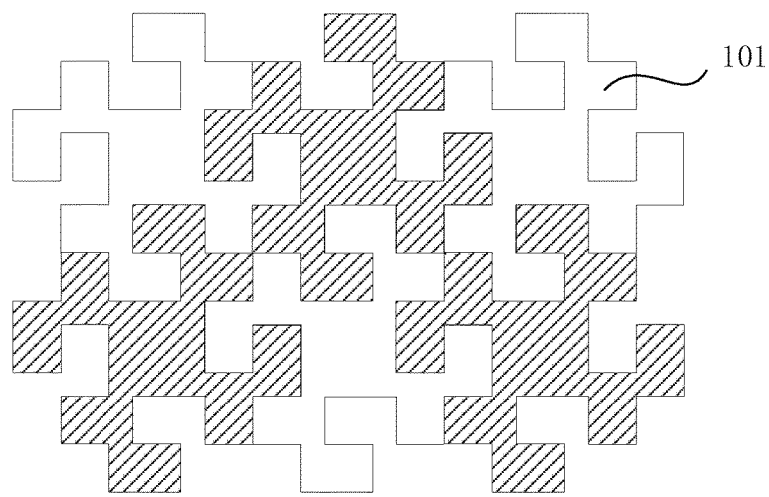
FIG. 2A is a schematic diagram showing the distribution of the touch electrodes in an in-cell touch panel in the related art.
Figure 2B:
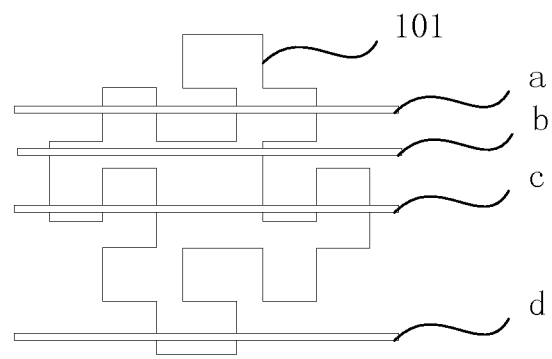
FIG. 2B is a schematic diagram showing the generation principle of the bright stripes in the lateral direction in an in-cell touch panel in the related art.
Figure 2C:
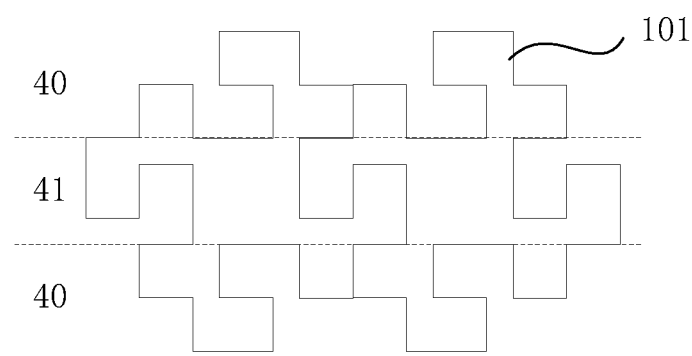
FIG. 2C is a schematic diagram showing the effect generated by the bright stripes in the lateral direction in an in-cell touch panel in the related art.
Figure 2D:
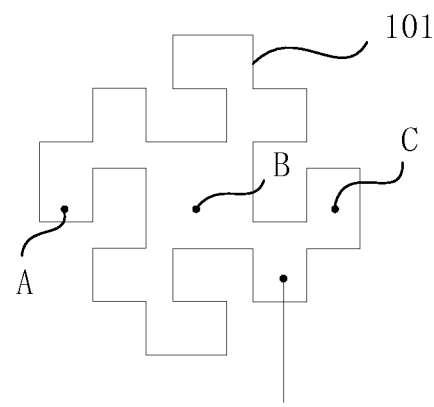
FIG. 2D is a schematic diagram showing the generation principle of the bright stripes in the lateral direction in an in-cell touch panel in the related art.
Figure 2E:
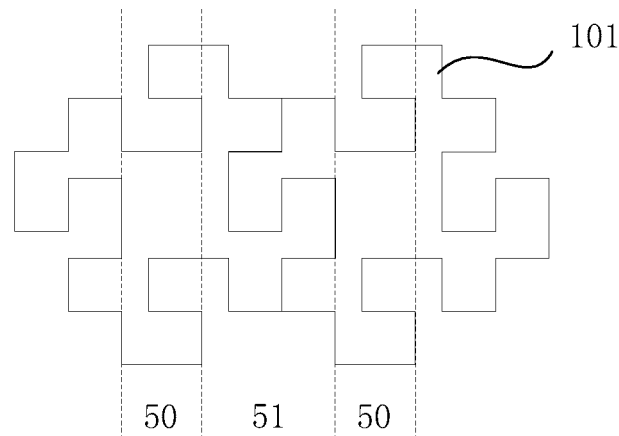
FIG. 2E is a schematic diagram showing the effect generated by the vertical dark line in an in-cell touch panel in the related art.
Figure 2F:
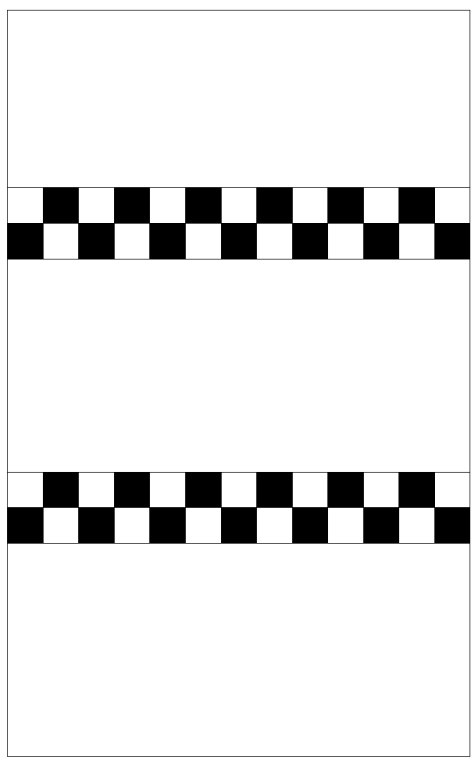
FIG. 2F is a schematic diagram showing an abnormal display effect in an in-cell touch panel in the related art.
Figure 3A:
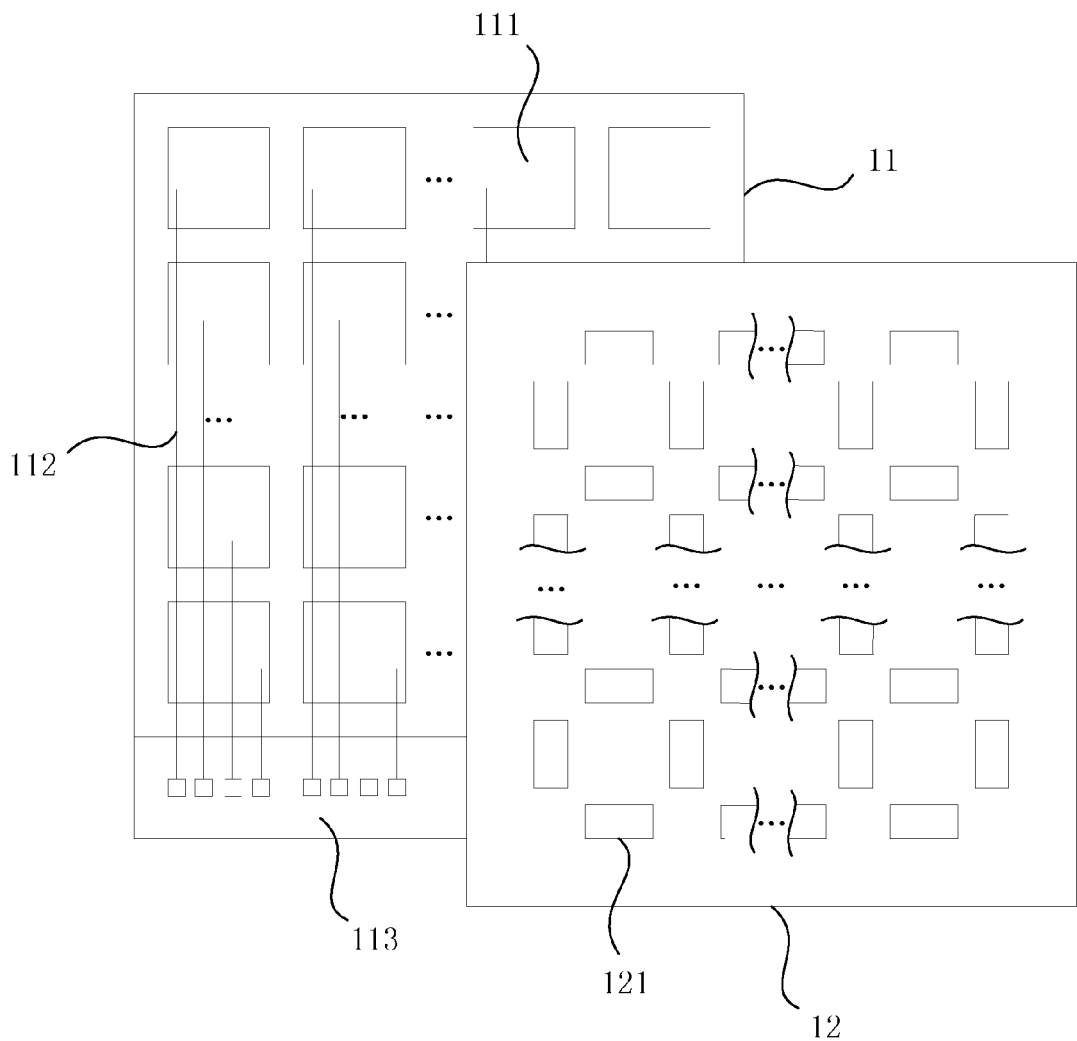
FIG. 3A is a exploded view showing the structure of a display panel provided by one embodiment of the disclosure.
Figure 3B:
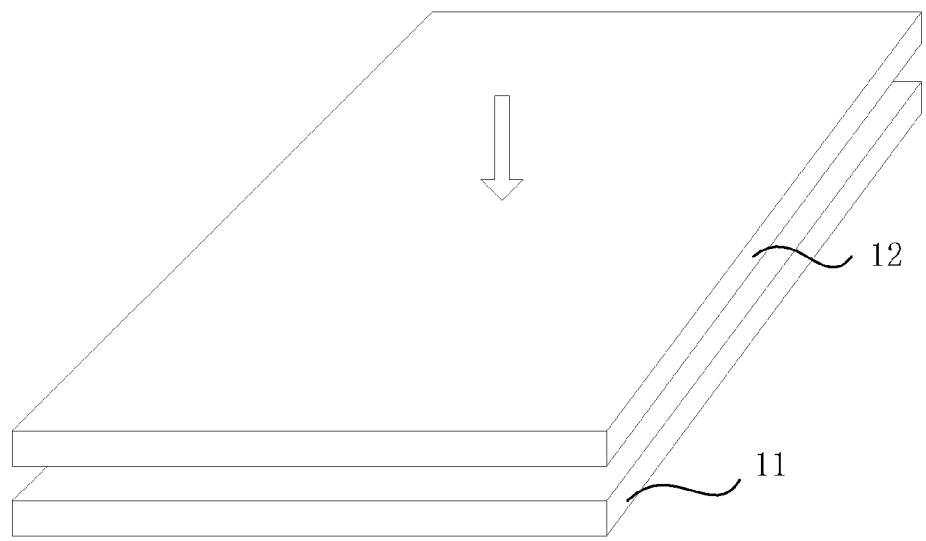
FIG. 3B is a hierarchical view showing the structure of a display panel provided by one embodiment of the disclosure.
Figure 3C:
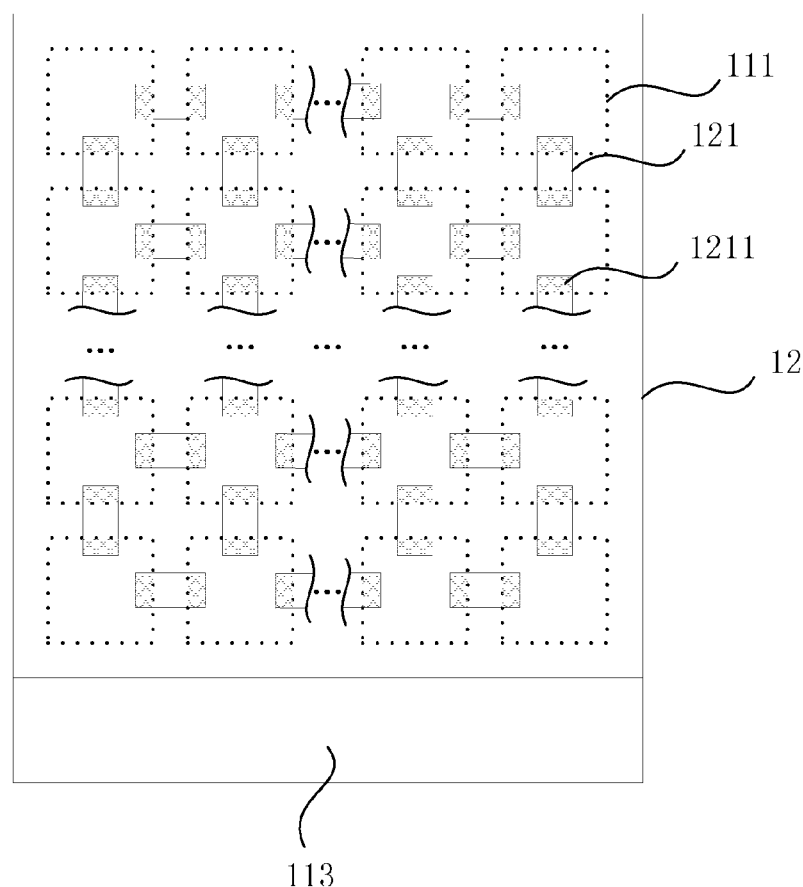
FIG. 3C is a plan view showing a display panel provided by one embodiment of the disclosure.

FIGS. 3A, 3B and 3C are a schematic exploded view, a schematic hierarchical view and a schematic top view, respectively, showing a structure of a display panel provided by one embodiment in accordance with the present disclosure. As shown in FIGS. 3A, 3B and 3C, the display panel comprises a first substrate 11 and a second substrate 12 disposed opposite to the first substrate 11.

The first substrate 11 comprises a plurality of touch electrodes 111 arranged in an array. The second substrate 12 includes a plurality of auxiliary touch electrodes 121, and each of the plurality of auxiliary touch electrodes 121 partly overlaps with projections of two adjacent touch electrodes in a direction perpendicular to the second substrate 12.

Generally, the plurality of touch electrodes 111 are arranged in an array, and the touch circuit 113, which is configured to drive the touch electrodes 111 for touch detection, is disposed at the bottom of the array. As shown in FIG. 3A, the plurality of touch electrodes 111 arranged in an array are electrically connected with a touch circuit 113. In the touch detection, the touch circuit 113 generates a touch driving signal and transmits the touch driving signal to the touch electrodes 111 by touch wires 112, so that the touch electrodes 111 have a certain amount of charge. The touch circuit 113 reads the change in an amount of charge of the touch electrodes 111 through touch wires 112, and based on this, it can be determined that the touched region corresponding to which touch electrode(s) is touched, thereby determining the position of the touch point. The touch driving signal and the change in the amount of charge may be considered as pulse signals. In the touch detection process, the touch circuit 113 transmits pulse signals to drive the touch electrodes 111 through a touch wire 112, and receives the pulse signals through the same touch wire 112 to determine the position of the touch point.

The above process is a process under an ideal condition. In a practical process, changes in environment and habits may lead to errors in the touch detection. For example, when using a stylus, since a nib of the stylus only has a small contact area with the capacitive touch panel, a small coupling capacitor caused by such a small contact area merely generates small current variation. That is, the intensity of the pulse signal is small, thus failing to a quick and precise determination.

In the present embodiment, the substrate carrying the touch electrodes 111 is defined as the first substrate 11. The touch electrodes 111, the first substrate 11 and the corresponding connection manner are the same with those in the related art. The layer above the first substrate 11 is defined as the second substrate 12, and a plurality of auxiliary touch electrodes 121 are disposed on the second substrate 12. Different from the case that the touch electrode 111 is electrically connected to the touch circuit 113 through the touch wire 112, each of the plurality of auxiliary touch electrodes 121 is an independent conductor. Each of the auxiliary touch electrodes 121 has a specific location relationship with the corresponding touch electrode 111. As shown in FIG. 3C, each of the auxiliary touch electrodes 121 partly overlaps with projections of two adjacent touch electrodes 111 in a direction perpendicular to the second substrate 12 (that is, the direction indicated by the arrow in FIG. 3B). FIG. 3C only shows a structural relationship of the first substrate 11 and the second substrate 12. The dash line box in FIG. 3C represents the position of the touch electrode 111, and the solid line box represent the position of the auxiliary touch electrode 121. The shadow portion in the auxiliary touch electrode 121 represents the overlapping portion 1211 where the auxiliary touch electrode 121 is overlapped with two adjacent touch electrodes 111. It is apparent from FIG. 3C that, although the size of the auxiliary touch electrode 121 is smaller than that of the touch electrode 111, an electric field is established between the auxiliary touch electrode 121 and the two adjacent touch electrodes 111 in term of the distribution of the auxiliary touch electrodes 121. For example, in the case that the touch operation is performed on the position corresponding to a certain overlapping portion 1211, current variation may possibly be present in or detected at only the touch electrode 111 just below the overlapping portion 1211 in the related art. In the present embodiment, however, in the case that the touch operation is performed at the position corresponding to the overlapping portion 1211, not only current variation can be detected at the touch electrode 111 just below the overlapping portion 1211, but also current variation can be detected at the adjacent touch electrode 111, because of the presence of the auxiliary touch electrode 121, thereby positioning the touch point in the more precise and simpler way.

Figure 3D:
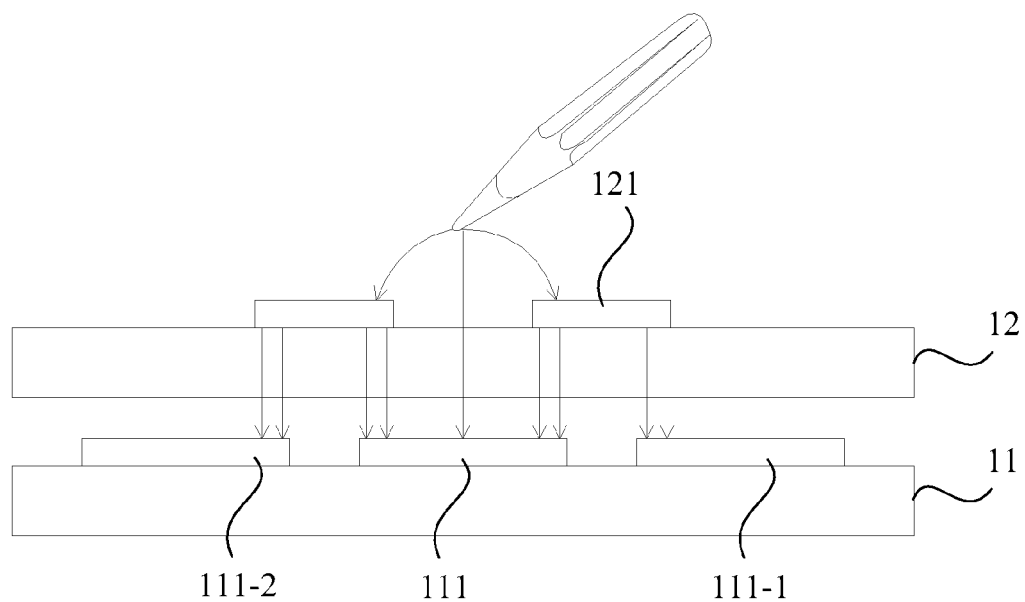
FIG. 3D is a schematic diagram showing the principle of a display panel provided by one embodiment of the disclosure.

When the touch operation is performed on the display panel of the present embodiment, as shown in FIG. 3D, in addition to the change in the number of the touch electrodes where current variation may possibly be present or be detected, the coupling capacitor is also changed correspondingly. In the present embodiment, a coupling capacitor is formed between the nib of the stylus and the auxiliary touch electrode 121, and a coupling capacitor is formed between the auxiliary touch electrode 121 and the touch electrode 111. The distance between the auxiliary touch electrode 121 and the touch electrode 111 is smaller than that between the finger and the touch electrode 111 so as to more easily detect the touch operation on the surface of the capacitive touch panel with a same vertical distance by the touch electrodes 111. In particular, FIG. 3D shows a certain relative position relationship between the nib and the touch electrodes 111. In this case, the nib is just located over the touch electrodes 111. Although the nib is far away from the touch electrodes 111, a coupling capacitor may be formed between the nib and more than one auxiliary touch electrodes 121 since the nib is close to the auxiliary touch electrodes 121 and the auxiliary touch electrodes are distributed more discretely. The auxiliary touch electrode 121 partly overlaps in a direction perpendicular to the second substrate 12 with the projections of the touch electrode 111 and the touch electrode 111-1 adjacent to each other, or the auxiliary touch electrode 121 partly overlaps in a direction perpendicular to the second substrate 12 with the projections of the touch electrode 111-1 and the touch electrode 111-2 adjacent to each other. In addition to the coupling capacitor directly formed between the nib and the touch electrode 111, an intensity of the touch signal during the touch operation can also be enhanced by the coupling capacitor formed between the touch electrode 121 and touch electrodes 111-1, 111-2, thus performing the touch detection more sensitively.

In some embodiments, the overlapping portions 1211 of the touch electrodes 111 and the auxiliary touch electrodes 121 have a same shape with each other. The same shape results in the same variation coefficient for the pulse signals, thus making the determination of the touch position simpler. In some embodiments, the shape of the overlapping portion 1211 is a rectangle or a square. The demand for processing and hence the processing cost is lower in the case that the shape of the overlapping portion 1211 is a rectangle or a square. Furthermore, in the case that the shape of the touch electrode 111 is a square and the shape of the overlapping portion 1211 is also a square, the length of the overlapping portion 1211 is less than or equal to a quarter of the length of the touch electrode 111.

In the case that the shape of the touch electrode 111 is a square and the shape of the overlapping portion 1211 is also a square, the length of the overlapping portion 1211 is less than or equal to a quarter of the length of the touch electrode 111, and hence the area of the overlapping portion 1211 is less than or equal to $\frac{1}{16}$ of the area of the touch electrode 111, thus decreasing the impaction of the auxiliary touch electrode 121 on the display state. In addition, to further decrease the impaction of the auxiliary touch electrodes 121 on the display state, the auxiliary touch electrodes 121 are made of transparent conductive material, such as Indium tin oxide (ITO), Indium zinc oxide (IZO), or a combination thereof.

The plurality of auxiliary touch electrodes 121 are disposed at a side of the second substrate 12 facing the first substrate 11 or at a side of the second substrate 12 away from the first substrate 11, or the plurality of auxiliary touch electrodes 121 are integrated inside the second substrate 12.

In the case that the auxiliary touch electrodes 121 are made of transparent conductive material, the auxiliary touch electrodes 121 have little impact on the circuit in the absence of the touch process, so that the auxiliary touch electrodes 121 may be disposed at different layers, even be integrated with a substrate with other functions, for example, be integrated in a color filter substrate or a cover plate.

In a summary, the plurality of auxiliary touch electrodes are arranged between the plane including the touch electrodes and the touch contact plane, and a projection of each of the plurality of auxiliary touch electrodes partly overlaps projections of two adjacent touch electrodes in the direction perpendicular to the second substrate. In the touch operation, a coupling capacitor is formed between the touch medium (such as a finger or a stylus) and the auxiliary touch electrode and a coupling capacitor is formed between the auxiliary touch electrode and the touch electrode, so that the vertical distance between the touch medium and the touch electrode is decreased, and more touch electrodes are involved in each touch operation, thus reducing the difficulty of determining the touch position and the precision requirement for the touch operation.

Figure 4A:
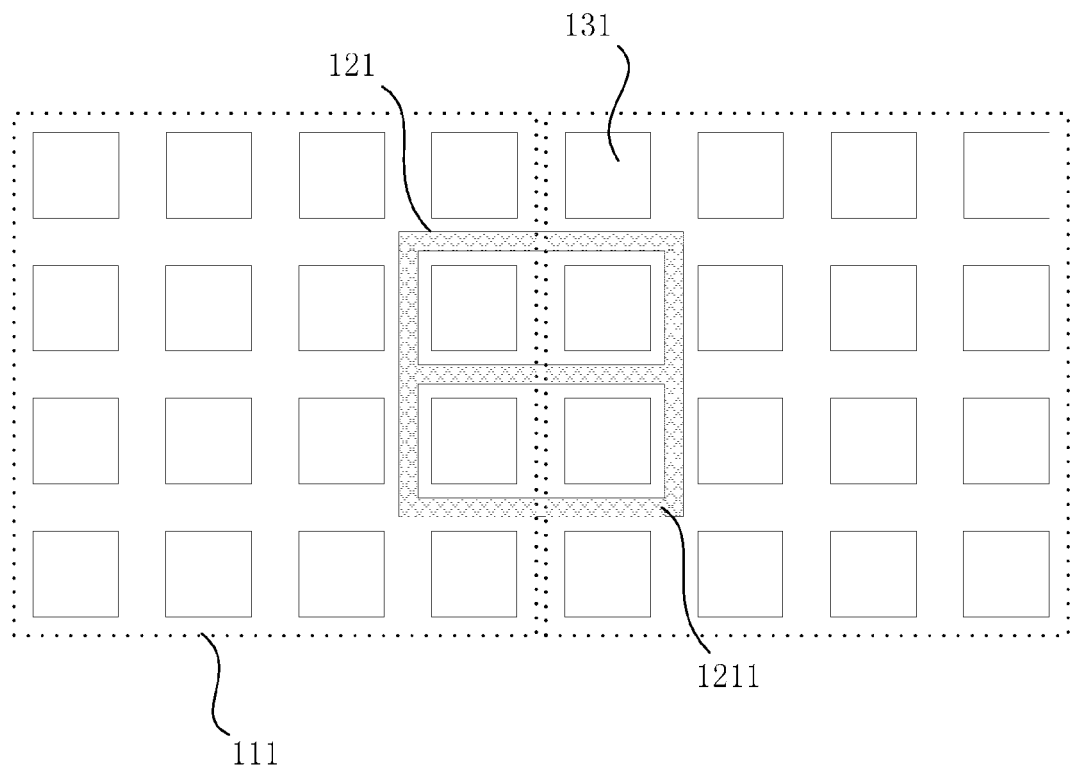
FIG. 4A is a top view showing a display panel provided by another embodiment of the disclosure.
Figure 4B:
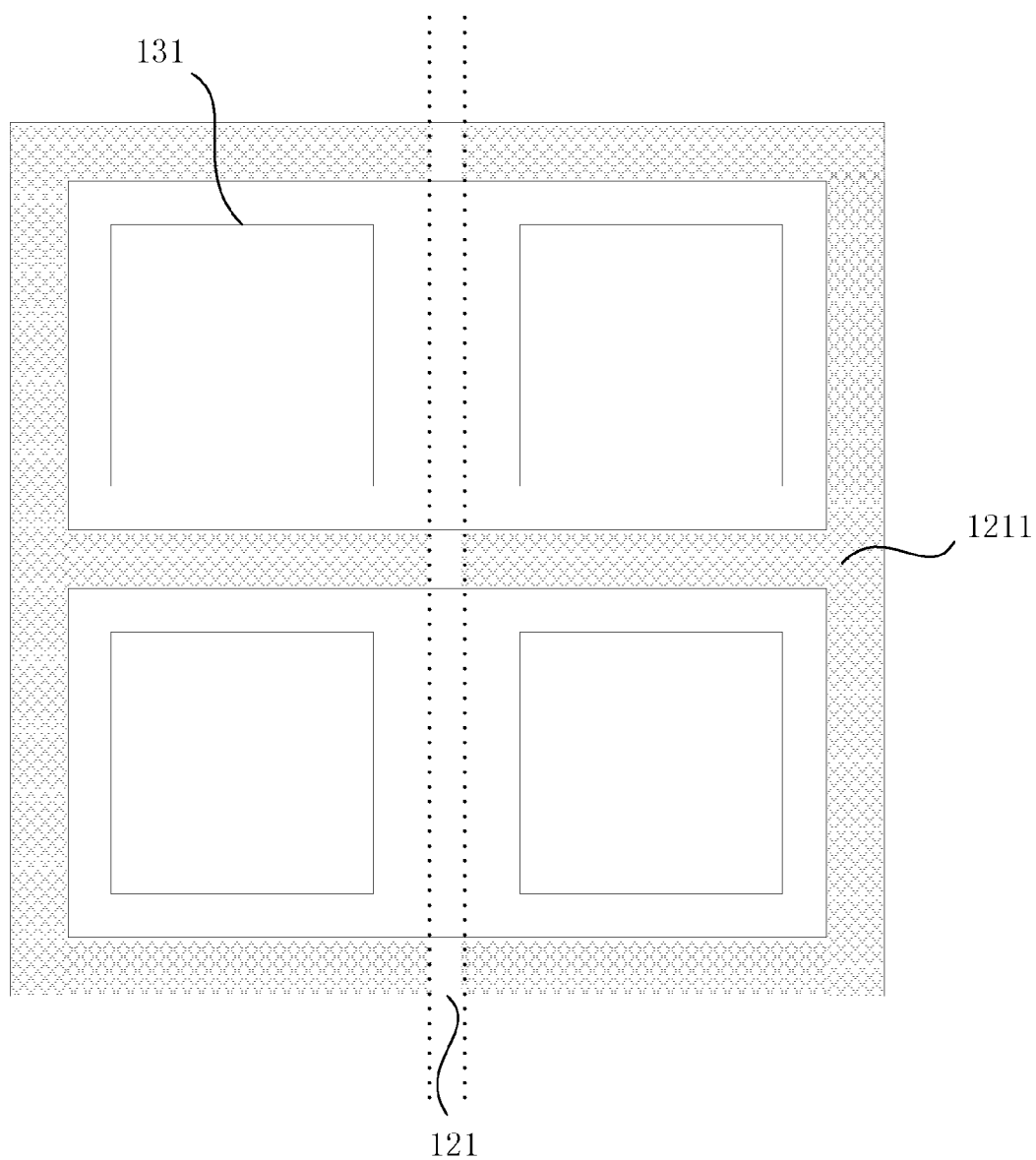
FIG. 4B is a top view showing the auxiliary touch electrodes of a display panel provided by another embodiment of the disclosure.
Figure 4C:
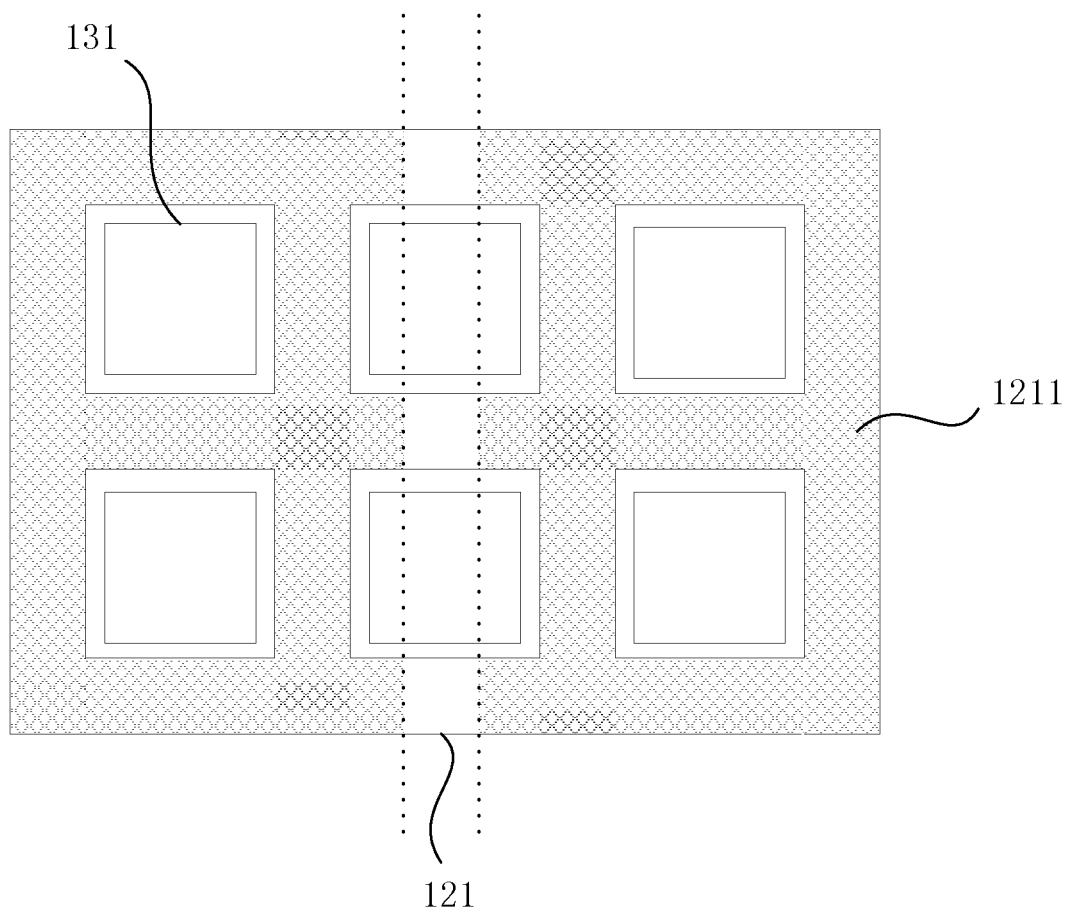
FIG. 4C is a top view showing the auxiliary touch electrodes of another display panel provided by another embodiment of the disclosure.

FIGS. 4A, 4B and 4C are a schematic top view showing a display panel provided by another embodiment of the present disclosure, a schematic top view showing the auxiliary touch electrodes of a display panel provided by another embodiment of the present disclosure, and a schematic top view showing the auxiliary touch electrodes of another display panel provided by another embodiment of the present disclosure respectively.

In the present embodiment, the plurality of auxiliary touch electrodes are made of metal material. Examples of the material include gold, silver and copper, and any other suitable materials. Further, the plurality of auxiliary touch electrodes is arranged in a mesh manner.

The display panel further comprises a pixel electrode 131 and the plurality of auxiliary touch electrodes 121 do not overlap with the projection of the pixel electrode 131 in the direction perpendicular to the first substrate 11. In the present disclosure, the auxiliary touch electrodes 121 are made of metal material which is light-tight. For this material property, in the present embodiment, the structure of the auxiliary touch electrodes 121 is further designed to improve the transmittance.

In addition to the touch electrode 111 for achieving touch function, the display panel typically includes the pixel electrodes 131 for achieving display function, and in the present embodiment, the auxiliary touch electrodes 121 are disposed along the light emitting direction of the display panel. In order not to affect the display effect of the display panel, the light-tight auxiliary touch electrodes 121 cannot overlap with the projections of the pixel electrodes 131 in a direction perpendicular to the first substrate 11. To this end, the auxiliary touch electrodes 121 are further arranged in a mesh manner, and the pixel electrodes 131 do not overlap with the projections of the auxiliary touch electrodes 121 in a direction perpendicular to the first substrate 11.

In the direction perpendicular to the first substrate 11, as shown in FIG. 4A, more than one pixel electrodes 131 are present in the projection of one touch electrode 111, and the touch electrodes 111 are arranged along the light emitting direction. The touch electrodes 111 themselves are made of transparent conductive material and have little impact on the light-emitting. However when the light-tight auxiliary touch electrodes 121 are provided, it should pay attention to the relative location relationship between the auxiliary touch electrodes 121 and the pixel electrodes 131. In the present embodiment, the projection of the auxiliary touch electrodes 121 dose not overlap in a direction perpendicular to the first substrate 11 with that of the pixel electrodes 131, or the projection of the auxiliary touch electrodes 121 in a direction perpendicular to the first substrate 11 are completely located in light-tight gaps of the array of the pixel electrodes 131. The related wirings are disposed in the gap of the array of the pixel electrodes 131, and these wirings are made of metal material, which cannot emit light and are light-tight. Furthermore, the size of the auxiliary touch electrodes 121 is very small, so that the auxiliary touch electrodes 121 have little impact on the light emitting effect of the display panel in the case without shielding the light source.

The mesh manner has a number of specific designs. One is as shown in FIG. 4B, where each grid corresponds to a plurality of pixel electrodes 131. Another one is as shown in FIG. 4C, where each grid corresponds to one pixel electrodes 131. The specific design may be chosen based on the specific distribution and the ratio of the touch electrodes 111 and the pixel electrodes 131.

In the embodiments of the present disclosure, in the case that the display panel is an in-cell touch panel (i.e., In-Cell Tp), the first substrate further comprises a common electrode layer which comprises a plurality of common electrodes. The plurality of common electrodes can be reused to the touch electrodes and the reused common electrodes can access to the display circuit and the touch circuit to implement the display control and the touch detection in a time-division manner.

In the embodiments provided by the present disclosure, the shape of the common electrodes is a rectangle, and an electric field relationship between two adjacent common electrodes is built by the auxiliary touch electrodes. Also, in the in-cell touch panel, the auxiliary touch electrodes may directly integrated on the second substrate, and the disposing manner of the auxiliary touch electrodes on the second substrate may have a number of choices. For example, the plurality of auxiliary touch electrodes are disposed at a side of the second substrate facing the first substrate or at a side of the second substrate away from the first substrate, or the plurality of auxiliary touch electrodes are integrated inside the second substrate to maintain the original structure thickness, thus making the electronic product thinner and lighter.

Various embodiments also provide a display device which includes the above display panel. In one embodiment, the plurality of auxiliary touch electrodes are arranged between the plane including the touch electrode and the touch contact plane, and a projection of each of the plurality of auxiliary touch electrodes partly overlaps projections of two adjacent touch electrodes in the direction perpendicular to the second substrate. In the touch operation, a coupling capacitor is formed between the touch medium (such as a finger and stylus) and the auxiliary touch electrode and a coupling capacitor is formed between the auxiliary touch electrode and the touch electrode, so that the vertical distance between the touch medium and the touch electrode is decreased, and more touch electrodes are involved in each touch operation, thus reducing the difficulty of determining the touch position and the precision requirement for the touch operation.

The preferred embodiments of the present disclosure are described as above, but not intended to limit the disclosure. Within the spirit and principle of the disclosure, any modifications, equivalent substitutions, improvements, etc., should fall into the scope of protection of the disclosure.

The invention claimed is:
1. A display panel, comprising:
a first substrate;
a second substrate disposed opposite to the first substrate;
a plurality of block-shaped pixel electrodes;
touch wires; and
a touch circuit,
wherein, the first substrate comprises a plurality of block-shaped touch electrodes arranged in an array, the second substrate comprises a plurality of auxiliary touch electrodes, each of the plurality of auxiliary touch electrodes is an independent conductor,
and wherein the touch circuit generates a touch driving signal, transmits the touch driving signal to the plurality of touch electrodes, and reads a change in an amount of charge of the plurality of touch electrodes through touch wires to determine a position of a touch point,
and wherein a projection of each of the plurality of auxiliary touch electrodes overlaps with projections of only two adjacent touch electrodes of the plurality of touch electrodes in a direction perpendicular to the second substrate,
and wherein the plurality of touch electrodes are made of transparent conductive material, the plurality of auxiliary touch electrodes are made of opaque metal and arranged in a mesh manner,
and wherein the projection of each of the plurality of touch electrodes covers more than one of the plurality of pixel electrodes, and projections of the plurality of auxiliary touch electrodes do not overlap with projections of the plurality of pixel electrodes,
and wherein each of the plurality of auxiliary touch electrodes comprises at least one opening, and a projection of each of the at least one opening covers at least one of the plurality of pixel electrodes.

2. The display panel of claim 1, wherein, the overlapping areas between projections of the plurality of auxiliary touch electrodes and projections of the plurality of touch electrodes in the direction perpendicular to the second substrate have same shape with each other.

3. The display panel of claim 2, wherein, the shape of the overlapping area is rectangle or square.

4. The display panel of claim 3, wherein, the shape of the touch electrode is a square, and in a case that the shape of the overlapping area is square, a length of the overlapping area is less than or equal to a quarter of a length of the touch electrode.

5. The display panel of claim 1, wherein, the plurality of auxiliary touch electrodes are made of transparent conductive material.

6. The display panel of claim 1, wherein the plurality of auxiliary touch electrodes are disposed at a side of the second substrate facing the first substrate, or the plurality of auxiliary touch electrodes are integrated inside the second substrate.

7. The display panel of claim 1, wherein the first substrate further comprises a common electrode layer including a plurality of common electrodes, and the plurality of common electrodes are reused to the touch electrodes.

8. The display panel of claim 1, wherein the plurality of auxiliary touch electrodes are insulated from each other, and the plurality of auxiliary touch electrodes are insulated from touch circuit.

9. The display panel of claim 1, wherein each of the plurality of auxiliary touch electrodes is in a block shape, and the sizes of each of the plurality of auxiliary touch electrodes is smaller than the sizes of each of the plurality of touch electrodes.

10. A display device, comprising a display panel, wherein, the display panel comprises:
 a first substrate;
 a second substrate disposed opposite to the first substrate;
 a plurality of block-shaped pixel electrodes;
 touch wires; and
 a touch circuit,
 wherein, the first substrate comprises a plurality of block-shaped touch electrodes arranged in an array, the second substrate comprises a plurality of auxiliary touch electrodes, each of the plurality of auxiliary touch electrodes is an independent conductor,
 and wherein the touch circuit generates a touch driving signal, transmits the touch driving signal to the plurality of touch electrodes, and reads a change in an amount of charge of the plurality of touch electrodes through touch wires to determine a position of a touch point,
 and wherein a projection of each of the plurality of auxiliary touch electrodes overlaps with projections of only two adjacent touch electrodes of the plurality of touch electrodes in a direction perpendicular to the second substrate,
 and wherein the plurality of touch electrodes are made of transparent conductive material, the plurality of auxiliary touch electrodes are made of opaque metal and arranged in a mesh manner,
 and wherein the projection of each of the plurality of touch electrodes covers more than one of the plurality of pixel electrodes, and projections of the plurality of auxiliary touch electrodes do not overlap with projections of the plurality of pixel electrodes,
 and wherein each of the plurality of auxiliary touch electrodes comprises at least one opening, and a projection of each of the at least one opening covers at least one of the plurality of pixel electrodes.

11. The display device of claim 10, wherein, the overlapping areas between projections of the plurality of auxiliary touch electrodes and projections of the plurality of touch electrodes in the direction perpendicular to the second substrate have same shape with each other.

12. The display device of claim 11, wherein, wherein, the shape of the overlapping area is rectangle or square.

13. The display device of claim 12, wherein, the shape of the touch electrode is a square, and in a case that the shape of the overlapping area is square, a length of the overlapping area is less than or equal to a quarter of a length of the touch electrode.

14. The display device of claim 10, wherein the plurality of auxiliary touch electrodes are made of transparent conductive material.

15. The display device of claim 10, wherein the plurality of auxiliary touch electrodes are disposed at a side of the second substrate facing the first substrate, or the plurality of auxiliary touch electrodes are integrated inside the second substrate.

16. The display device of claim 10, wherein the first substrate further comprises a common electrode layer including a plurality of common electrodes, and the plurality of common electrodes are reused to the touch electrodes.

* * * * *